(12) United States Patent
Kim (10) Patent No.: US 7,664,253 B2
(45) Date of Patent: Feb. 16, 2010

(54) MAIN TERMINAL AND A METHOD OF OPERATING THE SAME

(75) Inventor: Eog-kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 10/769,768

(22) Filed: Feb. 3, 2004

(65) Prior Publication Data

US 2004/0258237 A1  Dec. 23, 2004

(30) Foreign Application Priority Data

Jun. 23, 2003  (KR) .................. 10-2003-0040595

(51) Int. Cl.
    *H04M 1/00*  (2006.01)
(52) U.S. Cl. ............... 379/399.02; 379/251; 379/252; 379/359; 379/377
(58) Field of Classification Search ... 379/93.09–93.11, 379/413–413.03, 377, 399.01, 251–253, 379/359, 382, 399.02, 402, 412, 418
    See application file for complete search history.

(56) References Cited

U.S. PATENT DOCUMENTS

| | | | | |
|---|---|---|---|---|
| 6,434,232 B1 * | 8/2002 | Ludeman | ............... | 379/399.01 |
| 6,665,398 B1 * | 12/2003 | Ludeman | ............... | 379/399.01 |
| 6,757,378 B1 * | 6/2004 | Kunisch | .................. | 379/377 |

FOREIGN PATENT DOCUMENTS

| | | |
|---|---|---|
| EP | 0748104 | 12/1996 |
| EP | 0766447 | 4/1997 |
| JP | 9214635 | 8/1997 |

OTHER PUBLICATIONS

European Search Report issued Sep. 16, 2008 in European Application No. 04102547.9.

* cited by examiner

*Primary Examiner*—MD S Elahee
(74) *Attorney, Agent, or Firm*—Stanzione & Kim LLP (57) ABSTRACT

A main terminal and a method of operating the same. In this method of operating the main terminal, the main terminal is connected to a telephone network so as to communicate with the telephone network, and selectively connects an external terminal to the telephone network. To perform the method, first, if it is requested that the telephone network be disconnected from the external terminal and instead be connected to the main terminal, an internal current to flow into the main terminal is obtained from a loop voltage generated when the external terminal is in connection with the telephone network. Next, the internal current is applied to the main terminal. Thereafter, the telephone network is disconnected from the external terminal and instead connected to the main terminal. While the internal current is flowing in the main terminal, the main terminal maintains the loop voltage generated when the external terminal is in connection with the telephone network. Accordingly, the telephone network can be disconnected from an external terminal and instead be connected to the main terminal without generating an interrupt. Thus, an exchanger included in the telephone network can be prevented from malfunctioning due to the generation of the interrupt.

16 Claims, 7 Drawing Sheets

FIG. 9

MAIN TERMINAL AND A METHOD OF OPERATING THE SAME

CROSS-REFERENCE TO RELATED APPLICATIONS

This application claims the priority of Korean Patent Application No. 2003-40595, filed on Jun. 23, 2003, in the Korean Intellectual Property Office, the disclosure of which is incorporated herein in its entirety by reference.

BACKGROUND OF THE INVENTION

1. Field of the Invention

The present invention relates to a main terminal such as a facsimile or a personal computer, and more particularly, to a main terminal capable of being connected to an external terminal, such as a telephone or an automatic answering machine, and a method of operating the main terminal.

2. Description of the Related Art

A main terminal (not shown) generally includes a first direct current (DC current) supply unit (not shown) which communicates with an exchanger (not shown) included in a telephone network (not shown). When the main terminal is in connection with the telephone network, a first DC current signal is generated by the first DC current supply unit to obtain a first loop voltage. An external terminal (not shown) includes a second DC current supply unit (not shown) which communicates with the exchanger included in the telephone network via the main terminal. When the external terminal is in connection with the telephone network, a second DC current signal is generated by the second DC current supply unit to obtain a second loop voltage. The first and second DC current supply units have independent structures.

If the external terminal in connection with the telephone network generates a specific signal, the external terminal is disconnected from the telephone network, and the main terminal is connected to the telephone network. When the connection of the telephone network with the external terminal is switched to the connection with the main terminal, an interrupt (or a pulse) may be generated, because the level of the second DC current signal generated when the external terminal is in connection with the telephone network is different from that of the first DC current signal generated when the main terminal is in connection with the telephone network. In other words, when there is a change from the second loop voltage to the first loop voltage, an interrupt may be generated.

Figure 1A:
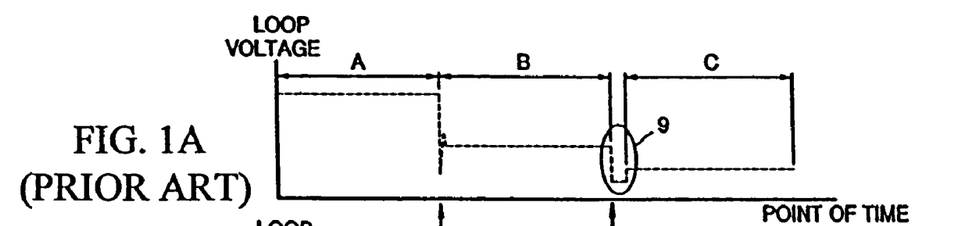
FIG. 1A and FIG. 1B are waveforms illustrating interrupts that may be caused by a conventional main terminal.
Figure 1B:
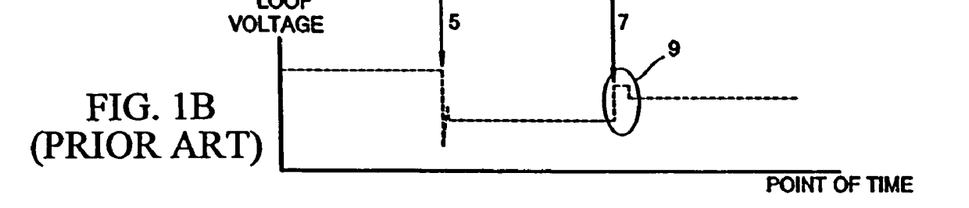

FIG. 1A and FIG. 1B are waveforms illustrating interrupts that may be generated by a conventional main terminal. When neither the main terminal nor an external terminal is connected to a telephone network, a loop voltage as shown in section "A" of FIG. 1A or FIG. 1B is supplied from an exchanger. At the point of time "5" when the external terminal is connected to the telephone network, a loop voltage as shown in section "B" of FIG. 1A or FIG. 1B is generated by a second DC current signal generated by a second DC current signal supply unit. At the point of time "7" when the external terminal is disconnected from the telephone network and the main terminal is connected to the telephone network, a loop voltage as shown in section "C" of FIG. 1A or FIG. 1B, is made by a first DC current signal generated by a first DC current signal supply unit. If the first DC current signal is lower than the second DC current signal, an interrupt "9" may be generated when the state of connection with the telephone network is changed, that is, when the section "B" of FIG. 1A changes to the section "C". If the second DC current signal is less than the first DC current signal, an interrupt "9" may be generated when the state of connection with the telephone network is changed, that is, when the section "B" of FIG. 1B changes to the section "C".

As described above, the conventional main terminal can generate an interrupt when the connection of the telephone network with the external terminal is switched to the connection with the main terminal. The exchanger may malfunction by recognizing the interrupt generated by the main terminal as a valid redial signal. Hence, the conventional main terminal may cause the exchanger to malfunction.

SUMMARY OF THE INVENTION

Accordingly, it is an aspect of the present invention to provide a method of operating a main terminal, by which a telephone network can be disconnected from an external terminal and then be connected to the main terminal without generating an interrupt.

It is another aspect of the present invention to provide a main terminal which can disconnect a telephone network from an external terminal and instead connect the telephone network to the main terminal without generating an interrupt.

Additional aspects and/or advantages of the invention will be set forth in part in the description which follows and, in part, will be obvious from the description, or may be learned by practice of the invention.

The foregoing and/or other aspects of the present invention are achieved by providing a method of operating a main terminal which is connected to a telephone network so as to communicate with the telephone network and selectively connects an external terminal to the telephone network. In this method, first, if it is requested that the telephone network be disconnected from the external terminal and instead connected to the main terminal, an internal current to be flowed into the main terminal is obtained from a loop voltage generated when the external terminal is in connection with the telephone network. Then, the obtained internal current is applied to the main terminal. Thereafter, the telephone network is disconnected from the external terminal and instead connected to the main terminal. While the internal current is flowing in the main terminal, the main terminal maintains the loop voltage generated when the external terminal is in connection with the telephone network.

The foregoing and/or other aspects of the present invention are also achieved by providing a main terminal which is connected to a telephone network so as to communicate with the telephone network and selectively connects an external terminal to the telephone network. The main terminal includes a signal checking unit, an internal current production unit, and a connection switching unit. The signal checking unit checks if a switching request signal requesting that the telephone network be disconnected from the external terminal and instead be connected to the main terminal is generated, and outputs the result of the checking as a first control signal. The internal current production unit obtains an internal current to flow into the main terminal, from a loop voltage generated when the external terminal is in connection with the telephone network, in response to the first control signal, and applies the internal current to the main terminal. In response to a selection signal, the connection switching unit disconnects the telephone network from the external terminal and instead connects the telephone network to the main terminal. While the internal current is flowing in the main terminal, the main terminal maintains the loop voltage generated when the external terminal is in connection with the telephone network, and the selection signal is generated when the loop voltage is maintained by applying the internal current to the main terminal.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
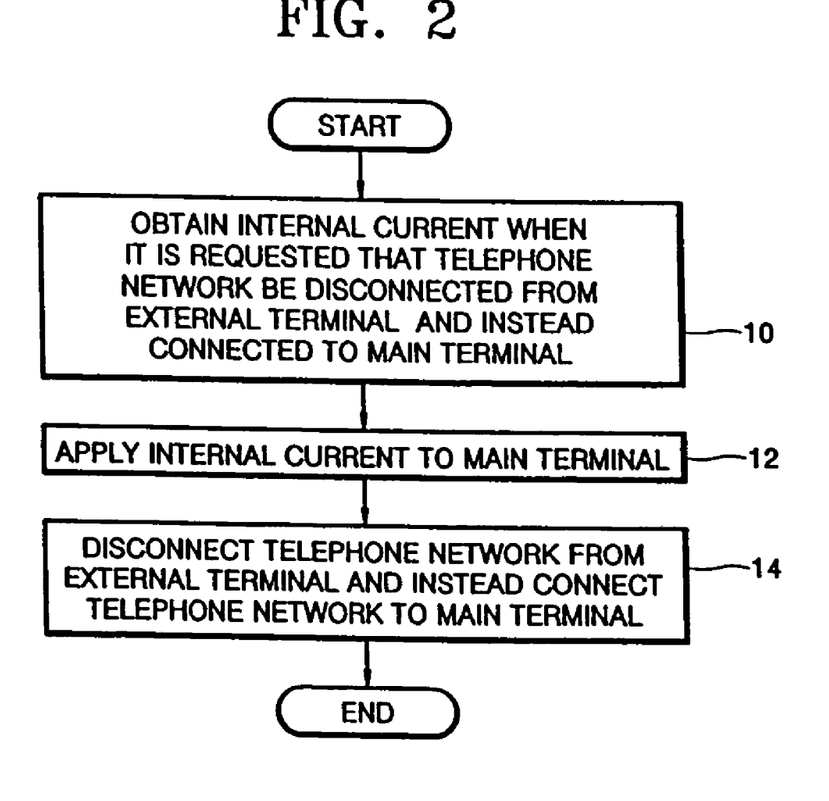
FIG. 2 is a flowchart illustrating a main terminal operating method according to an embodiment of the present invention.

FIG. 2 is a flowchart illustrating a main terminal operating method according to an embodiment of the present invention. This method includes operations 10 and 12, in which an internal current is obtained and applied to a main terminal, and operation 14 of switching a telephone network.

Figure 3:
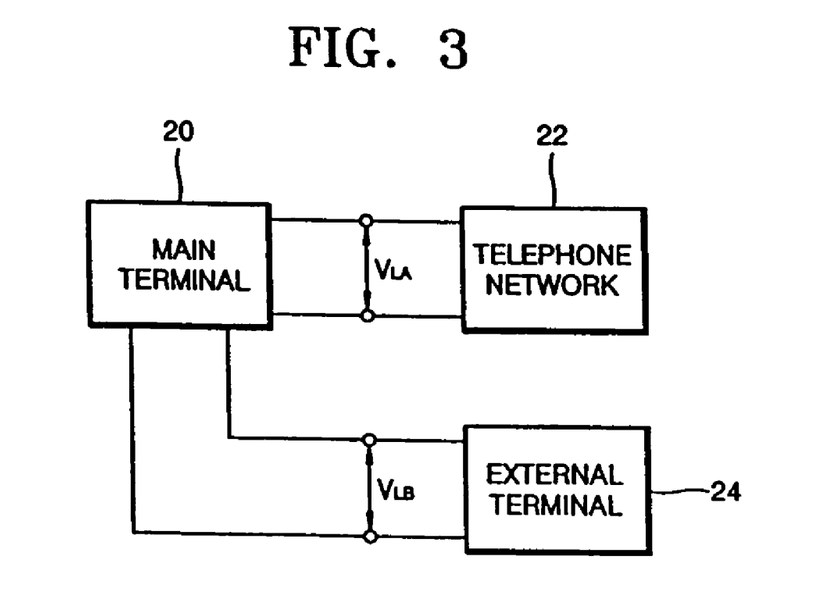
FIG. 3 is a block diagram facilitating understanding of the main terminal operating method of FIG. 2.

FIG. 3 is a block diagram to facilitate an understanding of the main terminal operating method of FIG. 2. In FIG. 3, there are a main terminal 20, a telephone network 22, and an external terminal 24.

The main terminal 20 of FIG. 3 is a facsimile or a personal computer which can transmit/receive image data via the telephone network 22. The external terminal 24 is a telephone or an automatic answering machine. The telephone network 22 may be a key phone or a Public Switched Telephone Network (PSTN) and may include an exchanger (not shown).

The main terminal 20 of FIG. 3 is connected to the telephone network 22 to perform communication and connects or disconnects the external terminal 24 to the telephone network 22. Referring to FIG. 2, in the method according to this embodiment of operating the main terminal 20, if it is requested that the connection of the telephone network 22 with the external terminal 24 be switched to a connection with the main terminal 20, an internal current to flow into the main terminal 20 is obtained using a loop voltage $V_{LA}$ ($=V_{LB}$) generated when the external terminal 24 is in connection with the telephone network 22, in operation 10. In other words, if it is requested that the telephone network 22 be disconnected from the external terminal 24 and instead be connected to the main terminal 20, the internal current is obtained.

Figure 4:
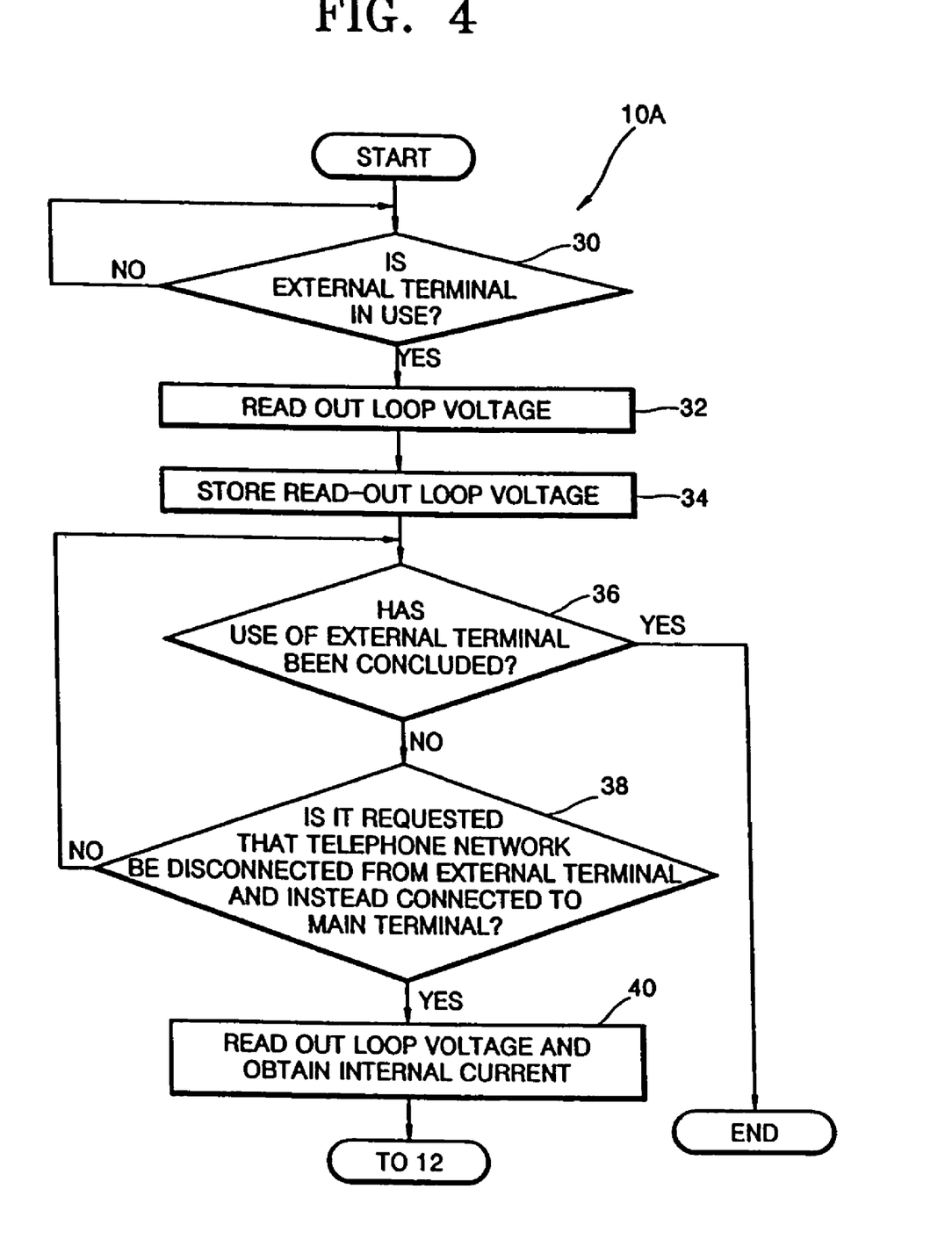
FIG. 4 is a flowchart illustrating an embodiment of operation 10 shown in FIG. 2.

FIG. 4 is a flowchart illustrating operation 10A, which is an embodiment of the present invention of operation 10 shown in FIG. 2. Operation 10A includes operations 30 through 34 of reading and storing a loop voltage and operations 36 through 38 of obtaining an internal current from the loop voltage if switching of the connection of the telephone network 22 is requested.

Referring to FIG. 4, in operation 30, it is determined whether the external terminal 24 is in use. If it is determined in operation 30 that the external terminal 24 is not in use, the determination of operation 30 is re-executed. On the other hand, if it is determined in operation 30 that the external terminal 24 is in use, the main terminal 20 reads the loop voltage $V_{LA}$ ($=V_{LB}$), in operation 32. Thereafter, in operation 34, the read loop voltage is stored.

In this embodiment of the present invention, after operation 34, it is determined whether the use of the external terminal 24 has been concluded, in operation 36. For example, it is determined in operation 36 whether the external terminal 24 is on the hook. If it is determined in operation 36 that the use of the external terminal 24 has been concluded, the main terminal operating method of FIG. 2 is concluded. On the other hand, if it is determined in operation 36 that the use of the external terminal 24 has not been concluded, another determination is made as to whether it is requested that the telephone network 22 be disconnected from the external terminal 24 and instead be connected to the main terminal 20, in operation 38. If it is determined in operation 38 that it is not requested that the telephone network 22 be disconnected from the external terminal 24 and instead be connected to the main terminal 20, the method goes back to operation 36.

Alternatively, unlike FIG. 4 illustrates, operation 10A may not include operation 36. In other words, operation 34 is followed by operation 38 of determining whether it is requested that the telephone network 22 be disconnected from the external terminal 24 and instead be connected to the main terminal 20. If it is determined in operation 38 that it is not requested that the telephone network 22 be disconnected from the external terminal 24 and instead be connected to the main terminal 20, the determination of operation 38 is re-performed.

If it is determined in operation 38 that it is requested that the telephone network 22 be disconnected from the external terminal 24 and instead be connected to the main terminal 20, the loop voltage stored in operation 34 is read out, and an internal current of the main terminal 20 is obtained using the read-out loop voltage, in operation 40.

Figure 5:
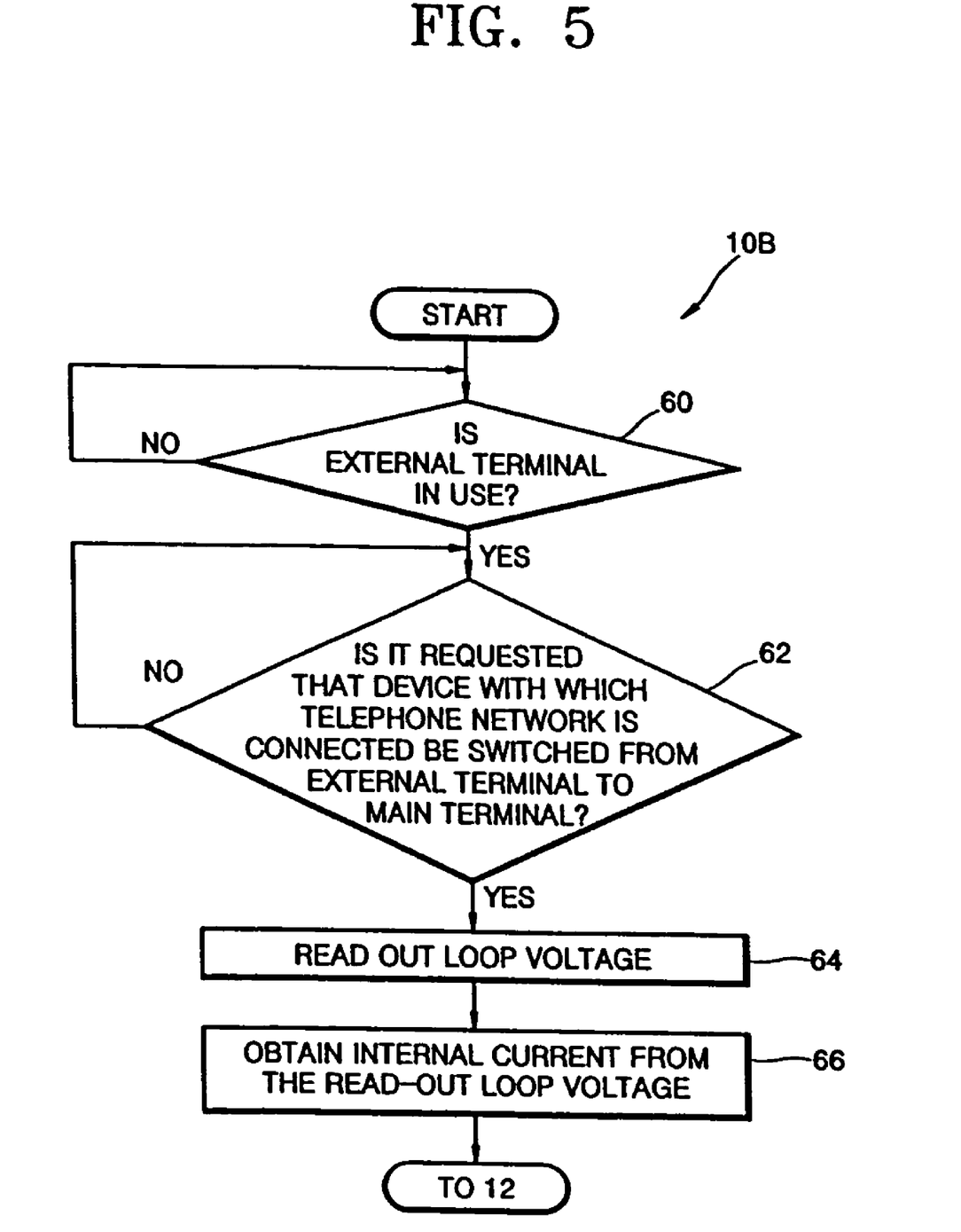
FIG. 5 is a flowchart illustrating another embodiment of operation 10 shown in FIG. 2.

FIG. 5 is a flowchart illustrating operation 10B, which is another embodiment of the present invention of operation 10 shown in FIG. 2. Operation 10B includes operations 60 through 64, in which a loop voltage is read out when switching of a connection state of the telephone network 22 is requested, and operation 66 of obtaining an internal current from the loop voltage.

Referring to FIG. 5, in operation 60, it is determined whether the external terminal 24 is in use. For example, in operation 30 or 60, it is determined whether the external terminal 24 is off the hook. That is, when the external terminal 24 is in use, it is off the hook.

If it is determined in operation 60 that the external terminal 24 is not in use, the determination of operation 60 is re-executed. On the other hand, if it is determined in operation 60 that the external terminal 24 is in use, another determination is made as to whether it is requested that the device with which the telephone network 22 be connected be switched from the external terminal 24 to the main terminal 20, in operation 62. If it is determined in operation 62 that it is not requested that the device with which the telephone network 22 is connected be switched from the external terminal 24 to the main terminal 20, the determination of operation 62 is re-executed.

On the other hand, if it is determined in operation 62 that it is requested that the device with which the telephone network 22 is connected be switched from the external terminal 24 to the main terminal 20, the main terminal 20 reads the loop voltage $V_{LA}$ (=$V_{LB}$), in operation 64.

Thereafter, in operation 66, an internal current is obtained from the read-out loop voltage $V_{LA}$ (=$V_{LB}$).

Referring back to FIG. 2, operation 10 is followed by operation 12 of applying the obtained internal current into the main terminal 20. While the internal current is flowing in the main terminal 20, the loop voltage $V_{LA}$ (=$V_{LB}$) generated when the external terminal 24 is in connection with the telephone network 22 is kept constant even when the telephone network 22 is disconnected from the external terminal 24 and instead connected to the main terminal 20.

After operation 12, the telephone network 22 is disconnected from the external terminal 24 and instead is connected to the main terminal 20, in operation 14.

The structure and operation of a main terminal according to an embodiment of the present invention will now be described with reference to FIG. 2 and FIGS. 6 through 9.

Figure 6:
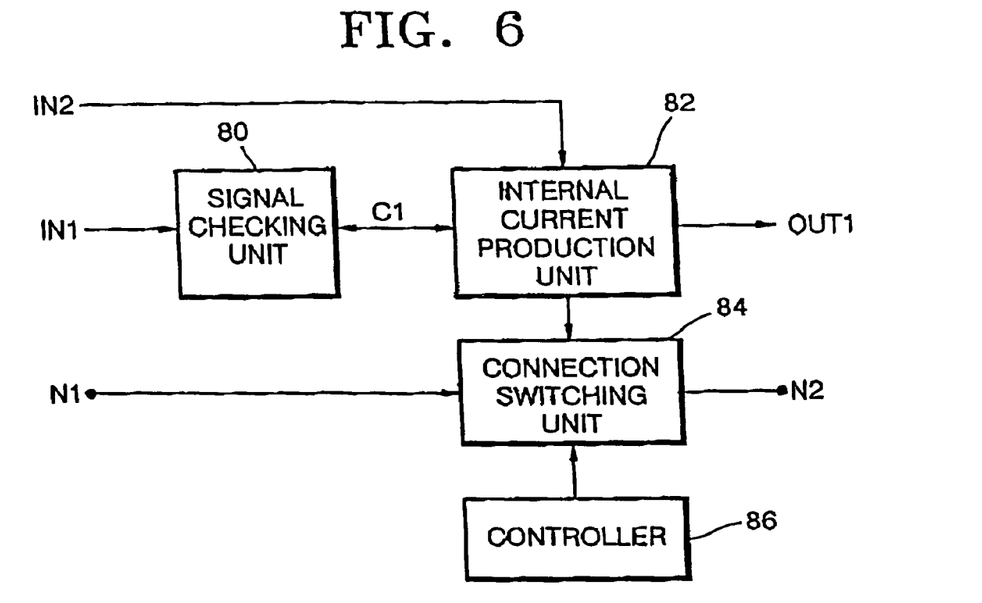
FIG. 6 is a block diagram of a main terminal according to another embodiment of the present invention.

FIG. 6 is a block diagram of the main terminal 20 according to another embodiment of the present invention. The main terminal 20 includes a signal checking unit 80, an internal current production unit 82, a connection switching unit 84, and a controller 86.

The main terminal 20 of FIG. 6 can operate according to the method of FIG. 2. The signal checking unit 80 and the internal current production unit 82 perform operation 10 of FIG. 2. The signal checking unit 80 checks if a switching request signal requesting that the telephone network 22 be disconnected from the external terminal 24 and instead be connected to the main terminal 20 is generated. The signal checking unit 80 outputs the result of the checking as a first control signal C1 to the internal current production unit 82. The switching request signal is generated by the external terminal 24 and applied to the signal checking unit 80 via an input port IN1. The switching request signal may denote an agreed Dual Tone Multi-Frequency (DTMF) code. The internal current production unit 82 produces an internal current from the loop voltage $V_{LA}$ (=$V_{LB}$) read out and received via an input terminal IN2 when the external terminal 24 is connected to the telephone network 22, in response to the first control signal C1 received from the signal checking unit 80. If the internal current production unit 82 recognizes from the first control signal C1 that the switching of a connection state of the telephone network 22 is requested, the internal current production unit 82 produces the internal current to flow into the main terminal 20 when the telephone network 22 is disconnected from the external terminal 24 and connected to the main terminal 20.

To perform operation 12, the internal current production unit 82 flows the produced internal current into the main terminal 20 via an output port OUT1.

Figure 7:
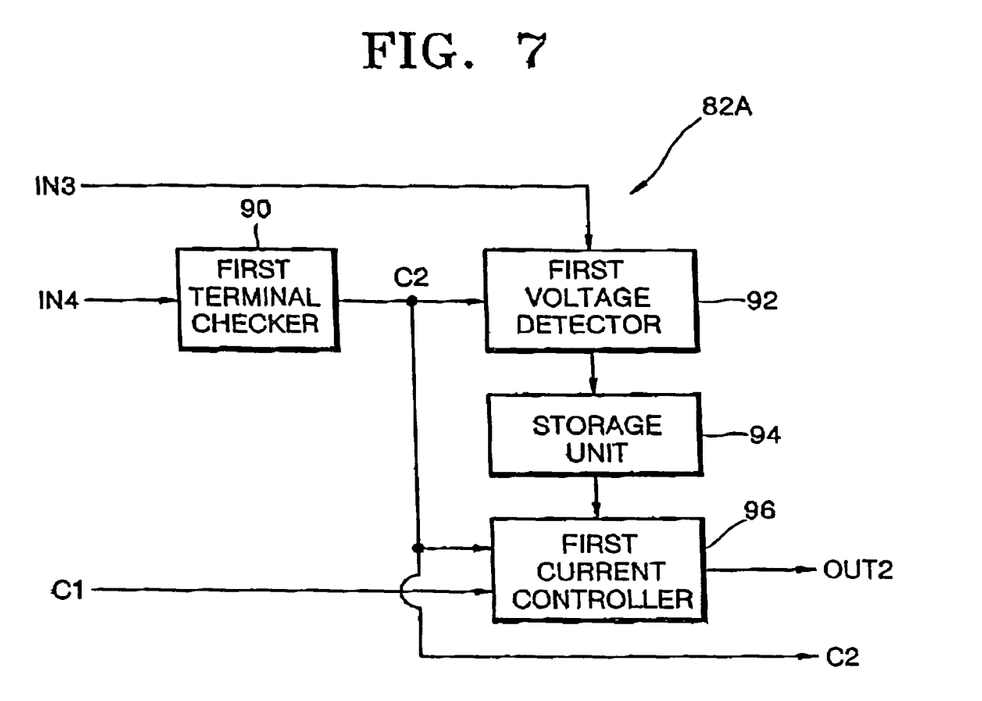
FIG. 7 is a block diagram of an embodiment of the internal current production unit shown in FIG. 6.

FIG. 7 is a block diagram of an internal current production unit 82A, which is another embodiment the internal current production unit 82 shown in FIG. 6. The internal current production unit 82A includes a first terminal checker 90, a first voltage detector 92, a storage unit 94, and a first current controller 96. The internal current production unit 82A performs operations 30 through 36 and 40 of FIG. 4 and operation 12 of FIG. 2.

To perform operations 30 or 36 of FIG. 4, the first terminal checker 90 checks if the external terminal 24 is in use, and outputs the result of the checking as a second control signal C2 to the first voltage detector 92 and the signal checking unit 80. Accordingly, to perform operation 38, the signal checking unit 80 checks the generation or non-generation of the switching request signal in response to the second control signal C2 received from the first terminal checker 90. If it is recognized from the second control signal C2 that the use of the external terminal 24 is not concluded, the signal checking unit 80 checks the generation or non-generation of the switching request signal.

To perform operation 32, the first voltage detector 92 reads out a loop voltage $V_{LA}$ (=$V_{LB}$) in response to the second control signal C2. If it is recognized from the second control signal C2 that the external terminal 24 is in use, the first voltage detector 92 reads out and receives the loop voltage $V_{LA}$ (=$V_{LB}$) via an input port IN3.

To perform operation 34, the storage unit 94 stores the loop voltage $V_{LA}$ (=$V_{LB}$) read out by the first voltage detector 92.

To perform operation 40, the first current controller 96 reads the loop voltage $V_{LA}$ (=$V_{LB}$) from the storage unit 94 and produces an internal current from the read loop voltage $V_{LA}$ (=$V_{LB}$), in response to the first control signal C1 received from the signal checking unit 80 and the second control signal C2 received from the first terminal checker 90. In other words, when it is recognized from the first control signal C1 that the switching of a connection state of a telephone network is requested and it is also recognized from the second control signal C2 that the use of the external terminal 24 is not concluded, the first current controller 96 obtains the internal current.

To perform operation 12, the first current controller 96 flows the produced internal current into the main terminal 20 via an output port OUT2.

Figure 8:
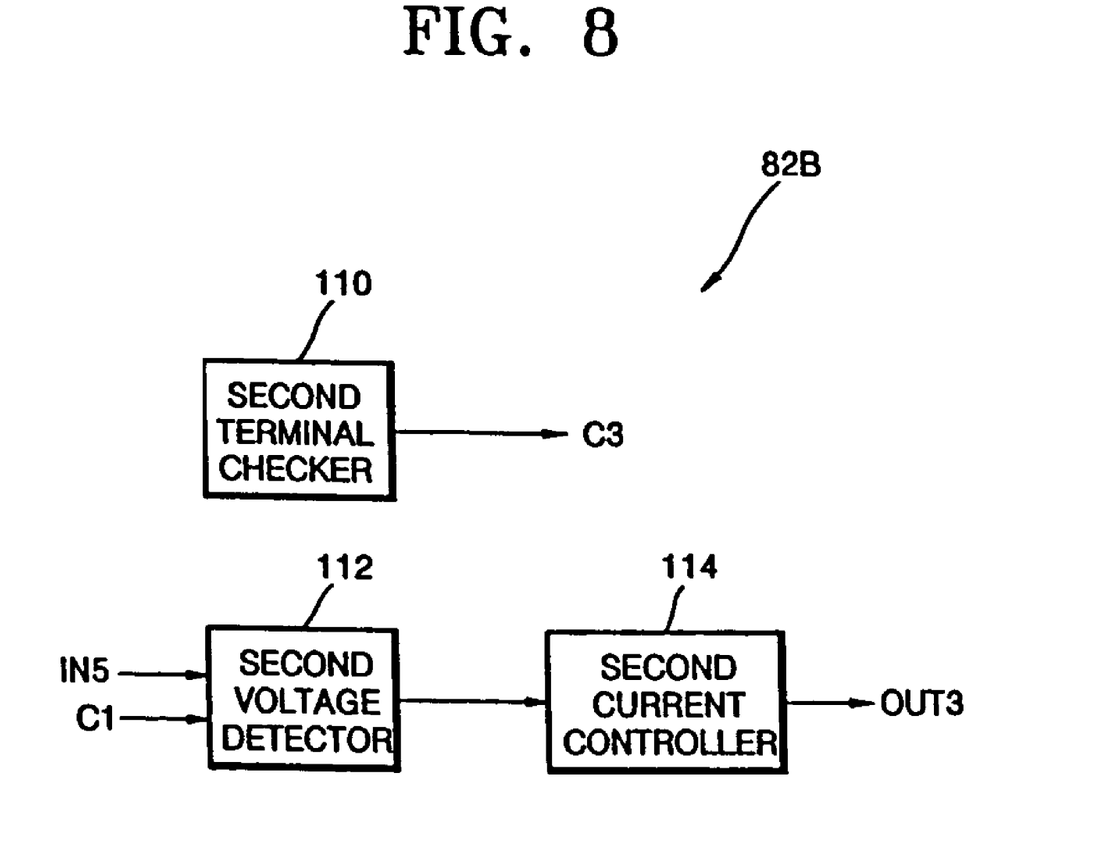
FIG. 8 is a block diagram of another embodiment of the internal current production unit shown in FIG. 6.

FIG. 8 is a block diagram of an internal current production unit 82B, which is yet another embodiment of the present invention of the internal current production unit 82 shown in FIG. 6. The internal current production unit 82B includes a second terminal checker 110, a second voltage detector 112, and a second current controller 114. The internal current production unit 82B performs operations 60, 64, and 66 of FIG. 5 and operation 12 of FIG. 2.

First, to perform operation 60 of FIG. 5, the second terminal checker 110 checks if the external terminal 24 is in use, and outputs the result of the checking as a third control signal C3 to the signal checking unit 80. If it is recognized from the third control signal C3 that the external terminal 24 is in use, the signal checking unit 80 checks the generation or non-generation of the switching request signal to perform operation 62.

To perform operation 64, in response to the first control signal C1 received from the signal checking unit 80, the second voltage detector 112 reads out and receives a loop voltage $V_{LA}$ (=$V_{LB}$) via an input port IN5 and outputs the loop voltage $V_{LA}$ (=$V_{LB}$) to the second current controller 114. If it is recognized from the first control signal C1 that the switching of a connection state of the telephone network 22 is requested, the second voltage detector 112 reads out the loop voltage $V_{LA}$ (=$V_{LB}$).

To perform operation 66, the second current controller 114 obtains an internal current from the loop voltage $V_{LA}$ (=$V_{LB}$), which is read out by and received from the second voltage detector 112.

To perform operation 12 of FIG. 2, the second current controller 114 flows the internal current into the main terminal 20 via an output terminal OUT3.

Figure 9:
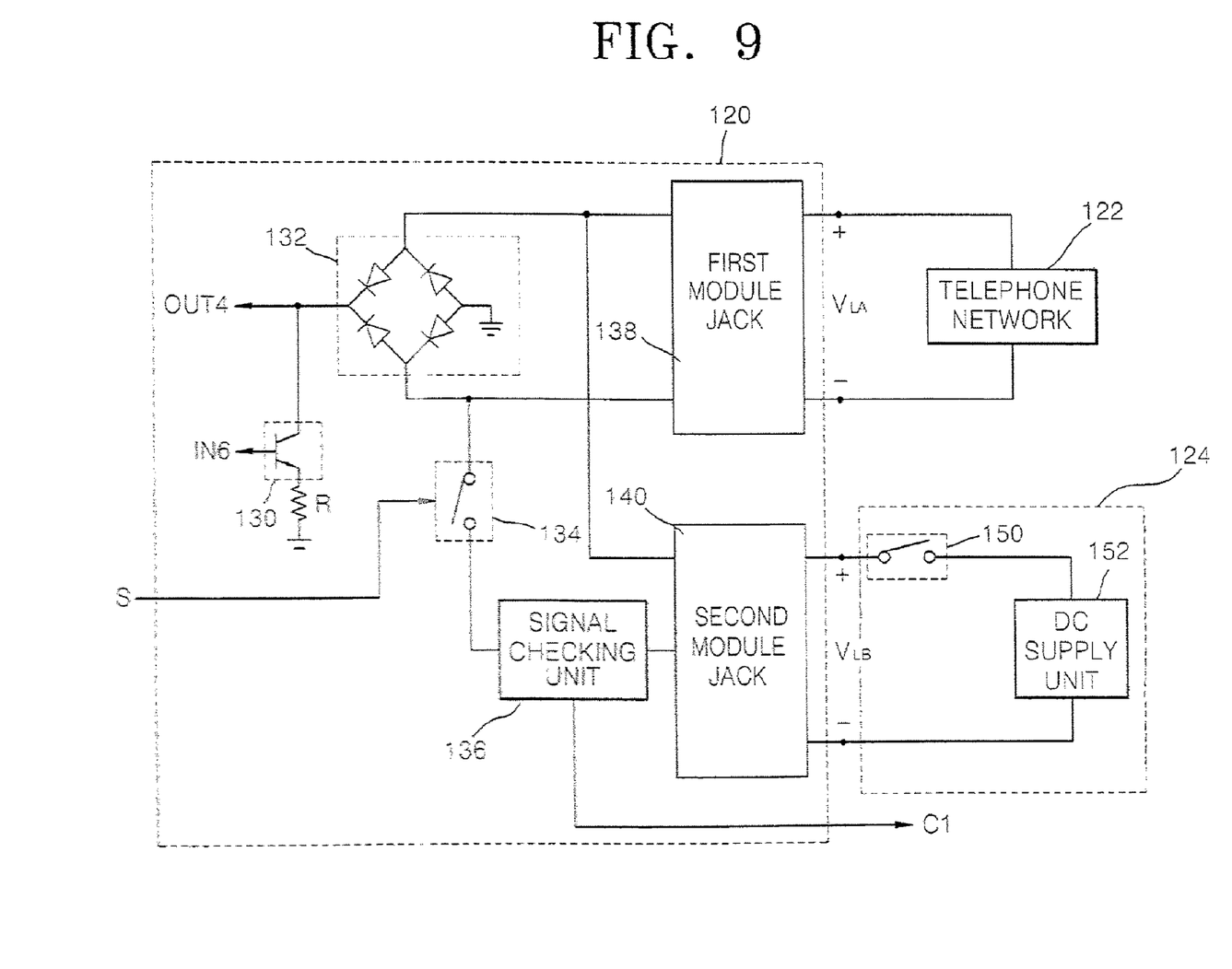
FIG. 9 is a block diagram of a main terminal according to another embodiment of the present invention.

To perform operation 14 of FIG. 2, in response to a selection signal S of FIG. 9, the connection switching unit 84 of FIG. 6 disconnects the telephone network 22 from the external terminal 24 and instead connects the telephone network 22 to the main terminal 20. The selection signal S is generated when the loop voltage $V_{LA}$ (=$V_{LB}$), generated when the external terminal 24 is in connection with the telephone network 22, can be kept constant even when the connection of the telephone network 22 with the external terminal 24 is switched by the internal current flowing in the main terminal 20. If it is recognized from the selection signal S that the loop voltage $V_{LA}$ (=$V_{LB}$) generated when the external terminal 24 is in connection with the telephone network 22 is kept constant even when this connection is switched, the connection switching unit 84 disconnects the telephone network 22 from the external terminal 22 and instead connects the telephone network 22 to the main terminal 20. The connection switching unit 84 is connected to the external terminal 24 via a first node N1 and also connected to the telephone network 22 via a second node N2. Alternatively, the first node N1 may be connected to the external terminal 24 via the signal checking unit 80.

To generate the selection signal S, the main terminal of FIG. 6 may include the controller 86. The controller 86 checks if the loop voltage generated when the external terminal 24 is in connection with the telephone network 22 is kept constant even when the telephone network 22 is disconnected from the external terminal 24 and instead connected to the main terminal 20 by the internal current flowing in the main terminal 20. The controller 86 generates the selection signal S in response to the result of the checking and outputs the selection signal S to the connection switching unit 84.

Alternatively, the main terminal of the FIG. 6 does not need the controller 86 to generate the selection signal S. In this case, the selection signal S may be generated by the first or second current controller 96 or 114. In this case, the first or second current controller 96 or 114 generates the selection signal S when an internal current is introduced into the main terminal 20.

FIG. 9 is a block diagram explaining a main terminal 120 according to another embodiment of the present invention. The main terminal 120 cooperates with a telephone network 122 and an external terminal 124.

The external terminal 124 of FIG. 9 includes a switch 150 and a direct current (DC) supply unit 152. The DC current supply unit 152 supplies a DC current signal to an exchanger (not shown) included in the telephone network 122 so that the external terminal 124 itself can be recognized by the exchanger. At this time, the switch 150 selectively transmits the DC current signal received from the DC current supply unit 152 to a second module jack 140 of the main terminal 120.

The main terminal 120 of FIG. 9 includes a transistor 130, a resistor R, a bridge diode 132, a switch 134, a signal checking unit 136, and first and second module jacks 138 and 140. Here, the signal checking unit 136 plays the role of the signal checking unit 80 of FIG. 6. The signal checking unit 136 checks if a switching request signal is received from the external terminal 124 via the second module jack 140, and generates a first control signal C1 in response to the result of the checking. Also, the signal checking unit 136 connects the second module jack 140 with the switch 134. The switch 134 plays the role of the connection switching unit 84 of FIG. 6. Referring to FIGS. 6 and 9, one side of the switch 134 connected to the bridge diode 132 corresponds to the second node N2, and the other side of the switch 134 connected to the signal checking unit 136 corresponds to the first node Ni. In other words, in response to the selection signal 5, the switch 134 disconnects the telephone network 122 from the external terminal 124 and instead connects the telephone network 122 to the main terminal 120. In FIG. 9, the switch 134 is illustrated in an off position. For example, the switch 134 is turned on when the telephone network 122 is in connection with the external terminal 124. If the loop voltage VLA (=VLB) generated when the external terminal 124 is in connection with the telephone network 122 can be kept constant even when the telephone network 122 is connected to the main terminal 120 by the internal current flowing in the main terminal 120, the switch 134 is turned off so that the telephone network 122 is connected to the main terminal 120.

Referring to FIGS. 6 through 9, when the switch 134 is turned off (as illustrated in FIG. 9), the bridge diode 132 of the main terminal 120 is connected to the telephone network 122 via the first module jack 138 so as to extract a current with a constant polarity and output the extracted current to the transistor 130 and, for example, the first or second voltage detector 92 or 112 (FIGS. 7 and 8) of the internal current production unit 82 (FIG. 6) via an output port OUT4 (FIG. 9). Hence, the first or second voltage detector 92 or 112 receives the extracted current, which is output from the bridge diode 132 via the output port OUT4, via the input port IN3 or IN5 and can read out a loop voltage from the extracted current.

As illustrated in FIG. 9, the transistor 130 has a collector in connection to the extracted current with a constant polarity from the bridge diode 132, and a base in connection to the produced internal current via IN6. The resistor R is coupled between an emitter of the transistor 130 and a reference potential. In other words, if the internal current output from, for example, the first or second current controller 96 or 114 of the internal current production unit 82 via the output port OUT2 or OUT3 is received by the base of the transistor 130, the loop voltage VLA (=VLB) is kept constant even when the switch 134 is turned into an off state.

As described above, in a main terminal according to the present invention and a method of operating the main terminal, a telephone network can be disconnected from an external terminal and instead be connected to the main terminal without generating an interrupt. Thus, an exchanger can be prevented from malfunctioning due to the generation of the interrupt.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of operating a main terminal which is connected to a telephone network to communicate with the telephone network and selectively connects an external terminal to the telephone network, the method comprising:

obtaining an internal current from a loop voltage generated when the external terminal is in connection with the telephone network via the main terminal, if it is requested that the telephone network be disconnected from the external terminal and instead be connected to the main terminal;

applying the obtained internal current to the main terminal; and disconnecting the telephone network from the external terminal and instead connecting the telephone network to the main terminal, wherein while the internal current is flowing in the main terminal, the main terminal maintains the loop voltage constant when the main terminal is in connection with the telephone network.

2. The method of claim 1, wherein the internal current obtaining operation comprises:
   determining whether the external terminal is in use;
   reading out the loop voltage if it is determined that the external terminal is in use;
   storing the read-out loop voltage;
   determining whether it is requested that the telephone network be disconnected from the external terminal and instead be connected to the main terminal; and
   reading out the stored loop voltage, obtaining the internal current from the loop voltage, and proceeding to the internal current applying operation, if it is requested that the telephone network be disconnected from the external terminal and instead be connected to the main terminal.

3. The method of claim 2, wherein the internal current obtaining operation further comprises:
   determining whether the use of the external terminal has been concluded, after the loop voltage storing operation,
   wherein if it is determined that the use of the external terminal has not been concluded, the method proceeds to the operation of determining whether it is requested that the telephone network be disconnected from the external terminal and instead be connected to the main terminal, and if it is not requested that the telephone network be disconnected from the external terminal and instead be connected to the main terminal, the method proceeds to the external terminal use conclusion/non-conclusion determining operation.

4. The method of claim 1, wherein the internal current obtaining operation comprises:
   determining whether the external terminal is in use;
   determining whether it is requested that the telephone network be disconnected from the external terminal and instead be connected to the main terminal, if it is determined that the external terminal is in use;
   reading out the loop voltage if it is requested that the telephone network be disconnected from the external terminal and instead be connected to the main terminal; and
   obtaining the internal current from the read-out loop voltage and proceeding to the internal current applying operation.

5. The method of claim 1, wherein the internal current obtaining operation comprises:
   determining whether the external terminal is in use;
   determining whether it is requested that the telephone network be disconnected from the external terminal and instead be connected to the main terminal if it is determined that the external terminal is in use, otherwise returning to the operation of determining whether the external terminal is in use;
   reading out the loop voltage if it is requested that the telephone network be disconnected from the external terminal and instead be connected to the main terminal, otherwise returning to the operation of determining whether it is requested that the telephone network be disconnected from the external terminal and instead be connected to the main terminal; and
   obtaining the internal current from the read-out loop voltage.

6. A main terminal which is connected to a telephone network to communicate with the telephone network and selectively connects an external terminal to the telephone network, the main terminal comprising:
   a signal checking unit which checks if a switching request signal requesting that the telephone network be disconnected from the external terminal and instead be connected to the main terminal is generated, and outputs the result of the checking as a first control signal;
   an internal current production unit which obtains an internal current to be flowed into the main terminal, from a loop voltage generated when the external terminal is in connection with the telephone network via the main terminal, in response to the first control signal, and applies the internal current to the main terminal; and
   a connection switching unit which disconnects the telephone network from the external terminal and instead connects the telephone network to the main terminal, in response to a selection signal,
   wherein while the internal current is flowing in the main terminal, the main terminal maintains the loop voltage constant when the main terminal is in connection with the telephone network, and the selection signal is generated when the loop voltage is maintained by applying the internal current to the main terminal.

7. The main terminal of claim 6, wherein the internal current production unit comprises:
   a first terminal checker which checks use or non-use of the external terminal and outputs the result of the checking as a second control signal;
   a first voltage detector which reads out the loop voltage in response to the second control signal;
   a storage unit which stores the read-out loop voltage; and
   a first current controller which reads out the loop voltage stored in the storage unit in response to the first and second control signals and applies the internal current obtained from the loop voltage to the main terminal,
   wherein the signal checking unit checks the generation or non-generation of the switching request signal in response to the second control signal.

8. The main terminal of claim 6, wherein the internal current production unit comprises:
   a second terminal checker which checks use or non-use of the external terminal and outputs the result of the checking as a third control signal;
   a second voltage detector which reads out the loop voltage in response to the first control signal; and
   a second current controller which obtains the internal current from the read-out loop voltage and applies the internal current to the main terminal,
   wherein the signal checking unit checks the generation or non-generation of the switching request signal in response to the third control signal.

9. The main terminal of claim 6, further comprising:
   a bridge diode which is connected to the telephone network to extract a current with constant polarity;
   a transistor which has a collector to receive the extracted current and a base to receive the internal current; and
   a resistor coupled between an emitter of the transistor and a reference potential,
   wherein the internal current production unit reads out the loop voltage from the extracted current.

10. The main terminal of claim 6, wherein the main terminal is a personal computer or a facsimile.

11. The main terminal of claim 6, wherein the external terminal is a telephone or an automatic answering machine.

12. The main terminal of claim 6, further comprising a controller which checks if the loop voltage generated when the external terminal is in connection with the telephone network is maintained when the internal current flows in the main terminal, and generates the selection signal in response to the result of the checking.

13. The main terminal of claim 6, wherein the internal current production unit generates the selection signal when the internal current is applied to the main terminal.

14. The main terminal of claim 6, wherein the switch request signal comprises an agreed Dual Tone Multi-Frequency code.

15. A main terminal which is connected to a telephone network and selectively connects an external terminal to the telephone network, the main terminal comprising:

an internal current production unit to apply an internal current to the main terminal from a loop voltage generated when the external terminal is in connection with the telephone network via the main terminal in response to a request that the telephone network be disconnected from the external terminal and instead be connected to the main terminal; and a controller to control the loop voltage constant according to the applied internal current when the telephone network is disconnected from the external terminal and connected to the main terminal.

16. The main terminal of claim 15, wherein the main terminal comprises a first DC supply unit, the external terminal comprises a second DC supply unit generating the loop voltage, and the controller controls the first DC supply unit to maintain the loop voltage constant when the telephone network is switched from the external terminal to the main terminal.

* * * * *

UNITED STATES PATENT AND TRADEMARK OFFICE
CERTIFICATE OF CORRECTION

PATENT NO. : 7,664,253 B2  Page 1 of 1
APPLICATION NO. : 10/769768
DATED : February 16, 2010
INVENTOR(S) : Eog-kyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Twenty-eighth Day of December, 2010

David J. Kappos
*Director of the United States Patent and Trademark Office*